United States Patent [19]

Dimeo et al.

[11] Patent Number: 5,289,932
[45] Date of Patent: Mar. 1, 1994

[54] CLOSURE CAP WITH PLASTIC LINER

[75] Inventors: Emidio Dimeo, Toronto; Kevin E. Greenhead, Beaverton, both of Canada

[73] Assignee: Canada Plastic Containers Limited, Scarborough, Canada

[21] Appl. No.: 91,411

[22] Filed: Jul. 14, 1993

Related U.S. Application Data

[63] Continuation of Ser. No. 868,649, Apr. 15, 1992, abandoned.

[51] Int. Cl.⁵ .............................................. B65D 53/04
[52] U.S. Cl. ................................... 215/349; 215/232; 215/341; 215/347; 215/350
[58] Field of Search ............... 215/341, 232, 347, 349, 215/350; 156/73.1, 73.5; 220/359

[56] References Cited

U.S. PATENT DOCUMENTS

| | | | |
|---|---|---|---|
| 3,632,004 | 1/1972 | Grimes et al. | 215/232 |
| 3,850,329 | 11/1974 | Robinson | 215/254 |
| 3,928,109 | 12/1975 | Pollock et al. | 215/349 X |
| 3,976,217 | 8/1976 | Dukess | 215/329 |
| 4,151,924 | 5/1979 | Jameson | 215/347 |
| 4,596,338 | 6/1986 | Vousif | 215/232 |
| 4,684,554 | 8/1987 | Ou-Yang | 215/341 X |
| 4,721,221 | 1/1988 | Barriac | 215/350 |
| 4,754,892 | 7/1988 | Retief | 215/329 |
| 4,917,949 | 4/1990 | Vousif | 215/232 X |
| 4,984,703 | 1/1991 | Burzynski | 215/350 |
| 5,183,171 | 2/1993 | Pherigo | 220/256 |

Primary Examiner—Allan N. Shoap
Assistant Examiner—Vanessa Caretto

[57] ABSTRACT

A plastic closure cap of the present invention includes a plastic interior liner. The cap and the liner are bonded by melting them to one another without penetrating either the cap or the liner. The bond between the cap and the liner is extremely durable and resistant to solvent vapour action.

2 Claims, 4 Drawing Sheets

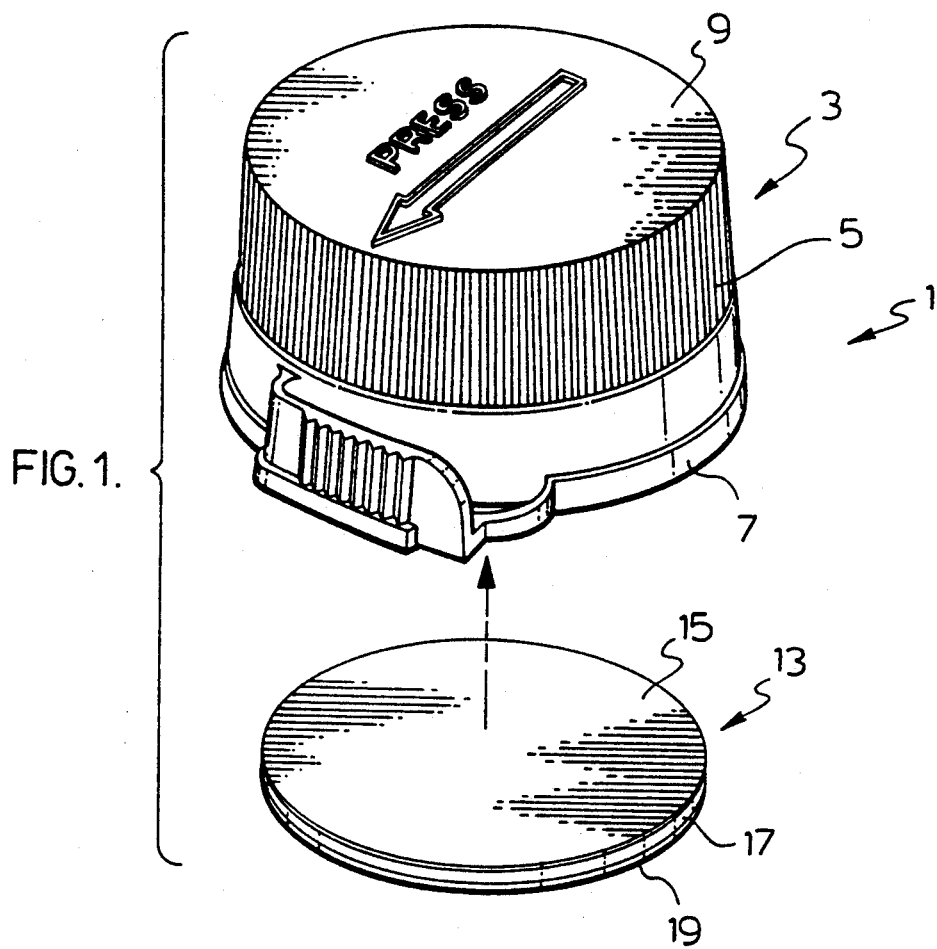
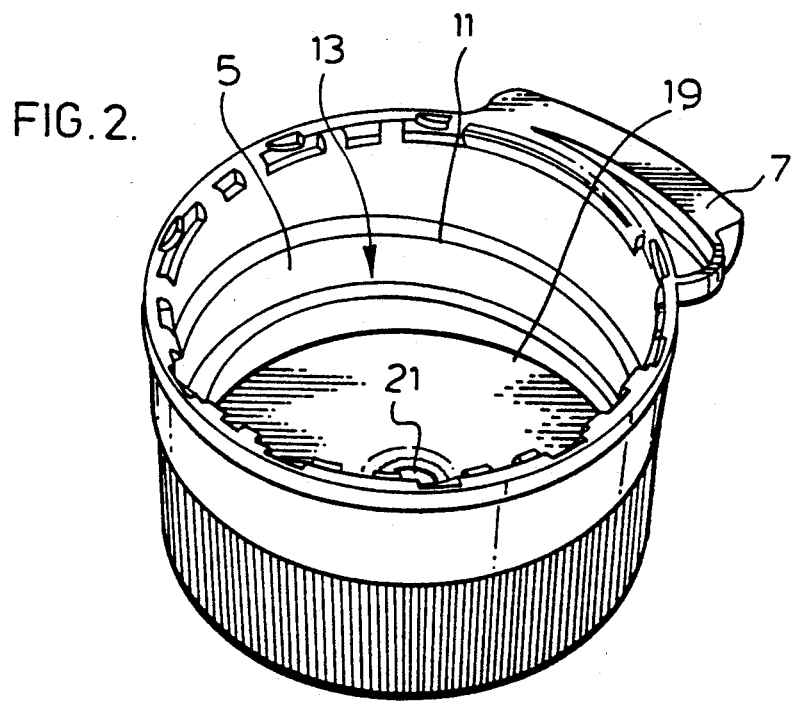

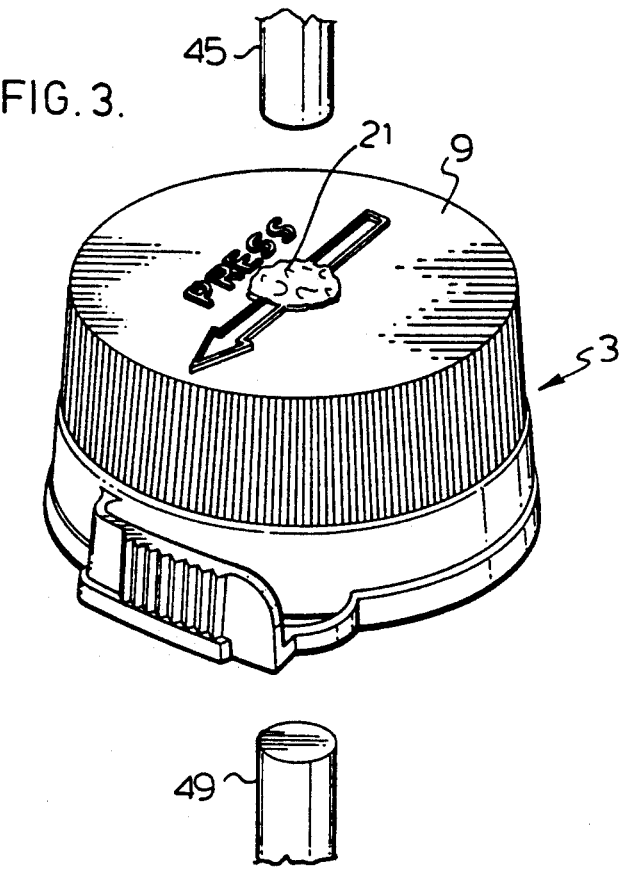
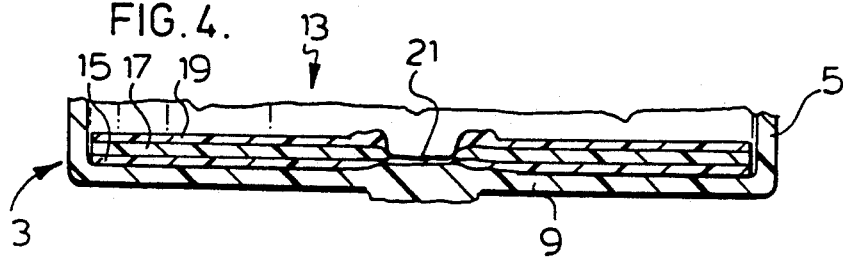
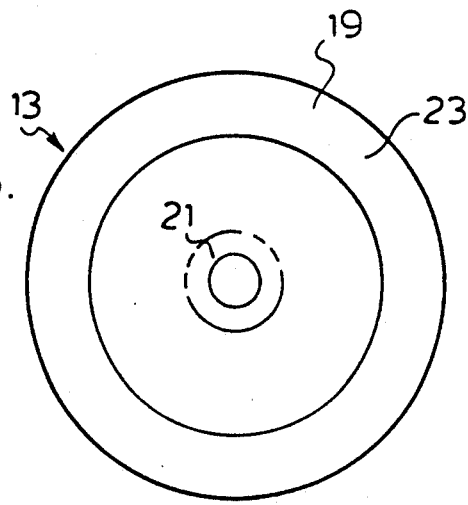

CLOSURE CAP WITH PLASTIC LINER

This is a continuation of application Ser. No. 07/868,649, filed Apr. 15, 1992 and now abandoned.

FIELD OF THE INVENTION

The present invention relates to a plastic closure cap having a plastic liner secured by a melt bond between the cap and the liner and particularly suited for use in capping liquid solvent containers where the liner is subjected to vapours from the solvent.

BACKGROUND OF THE INVENTION

Many of todays bottled liquid products give off harmful vapours which must be trapped within the bottle or container. Typical closure caps are made with interior liners of a material such as cardboard, cork, paper, and even metallic foil that is secured to the cap by means of a suitable adhesive.

None of the presently available liner securing adhesives are capable of withstanding the deteriorating action of solvent vapours. Furthermore, where these caps are used to seal a solvent container the actual liners themselves will break down and allow vapour escape from the containers.

SUMMARY OF THE INVENTION

The present invention provides a plastic closure cap including a plastic liner particularly designed to seal a solvent container with the liner being bonded to the cap in a manner such that the bond will not break down under vapour action from the solvent.

More particularly the present invention provides a plastic closure cap having a plastic interior liner with the cap and the liner being secured or bonded by melting them to one another. The bond is made such that it provides a very positive securing action without penetrating either the cap or the liner.

BRIEF DESCRIPTION OF THE DRAWINGS

The above as well as other advantages and features of the present invention will be described in greater detail according to the preferred embodiments of the present invention in which;

FIG. 1 is an exploded top perspective view of a plastic cap and plastic liner to be secured in the cap according to a preferred embodiment of the present invention.

FIG. 2 is a bottom perspective view of the liner secured within the cap of FIG. 1.

FIG. 3 is a top perspective view of the cap of FIG. 2 showing the bonding procedure of the liner to the cap according to a preferred embodiment of the present invention.

FIG. 4 is a sectional view through the bonded liner and cap of FIG. 3.

FIG. 5 is a plan view of the cap from the liner of FIG. 3.

DETAILED DESCRIPTION OF THE PREFERRED EMBODIMENTS

Figure 6:
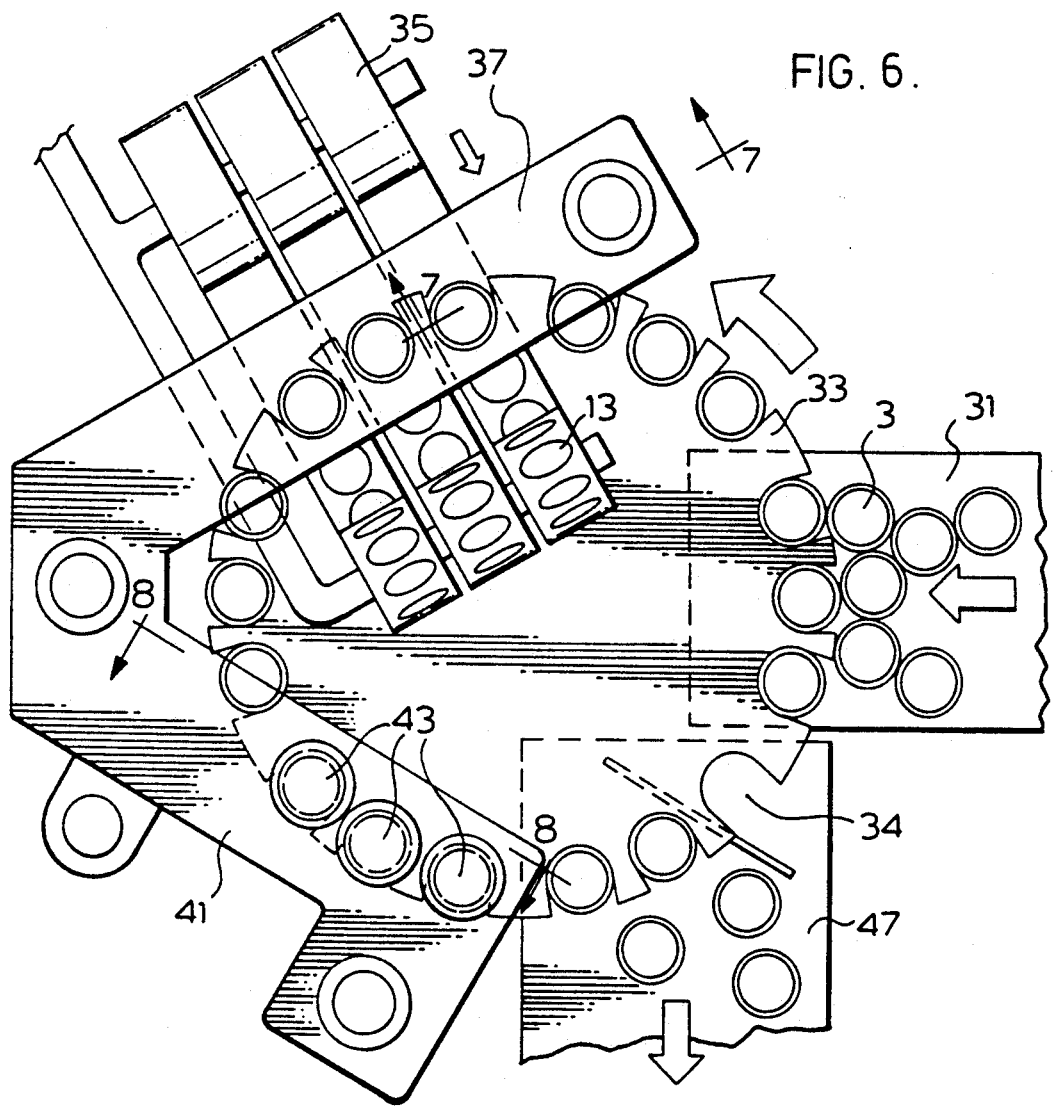
FIG. 6 is a plan view of an apparatus for assembling the cap and liner of FIG. 3 according to a preferred embodiment of the present invention.

A combination plastic closure cap and plastic liner is generally indicated at 1; the cap is generally indicated at 3; and the liner is generally indicated at 13.

Closure cap 3 is one which includes both tamper indicating and safety release features. The safety release features are provided internally of the cap and require as indicated that the cap be pressed at a certain location before it can be released from the container or bottle to which it is fitted. It also includes a tear away band 7 which must be removed in order for the cap to be opened and therefore clearly shows any tampering to the cap.

The safety release and tamper indicating features of the cap as described above are standard in the art and do not form part of the present invention.

Cap 3 includes a flat or at least substantially flat cap top wall 9 and a skirt 5 extending downwardly from the top wall of the cap. The interior of the skirt is threaded as indicated at 11 in FIG. 2 to provide the safety release feature.

The overall cap 3 is made from a plastic material preferably P.V.C. which is sufficiently strong to effectively close a bottle to which it is applied and which at the same time is sufficiently flexible to allow some bending of the cap to operate the safety release features, In addition the flexibility of the cap makes it durable.

Liner 13 fits to the inside of cap 3 and has a flat top surface 15 which mates flushly with the underside of the top wall 9 of the cap. The liner preferably has a diameter which matches the interior diameter of the cap with just enough clearance to fit the liner past the threads 11 to locate it on the under surface of the top wall of the cap.

In the preferred embodiment liner 13 has a multiple layer construction including an intermediate layer 17 and a bottom layer 19 in addition to the top layer 15. Layer 15 is made from a relatively hard durable plastic material either the same as or substantially the same as the material used in forming cap 3. The materials used in forming layer 15 and the top wall of the cap must have the same or similar melting temperatures for purposes of securing the liner to the cap as will be described later in greater detail.

Layer 17 of the liner is constructed of a more compressible preferably plastic or plastic foam material for purposes of providing a sealing effect on the container to be closed by the cap. Layer 19 is a further harder more durable layer the same as or similar to layer 15. Layer 19 provides a protective skin for layer 17, however, layer 19 may not be required in which case layer 17 would seat directly atop the mouth of the container to be closed and sealed by the cap.

Liner 13 once in position is secured by a melt bond to the under surface of the top wall 9 of the cap. Different types of heat sealing can be used, however, in the preferred embodiment the bonding is achieved by ultrasonic welding of the liner and cap to one another. The liner is not to be secured to the cap by means of a heat treatable adhesive which is subject to deterioration by the vapours from the contents of the container and which is to be distinguished from different types of heat treatment processors in which the liner and the cap are actually melted to one another. The reason that the liner and cap should have the same or at least similar melting temperatures is to ensure that they melt under the same conditions and properly bond to one another.

As best seen in FIGS. 3 and 4 of the drawings the bond area of the liner to the cap is generally indicated at 21. When using ultrasonic welding as shown in FIG. 3 the weld produces a thinning of both the liner and the cap in the immediate weld area with the plastic material being deformed outwardly around the weld area. The welding is done in a manner such that it does not completely penetrate either the liner or the cap to maintain the integrity and sealing properties of the closure.

The ultrasonic weld is performed by an upper welding tool tip 45 and a lower welding tool tip 49. According to ultrasonic welding procedures, one of the two welding tips vibrates at such a high speed relative to the other tip, that it causes molecular breakdown of the plastic material whereby the liner and the top wall of the cap bond in a homogeneous fashion at the weld area.

As will be seen the ultrasonic weld does produce some marring during the displacement of the plastic in the cap. In order to eliminate this as a possible aesthetic drawback the end of the welding tool can be provided with some sort of a small design pattern which then adds to the overall appearance of the cap.

The ultrasonic welding does not produce any heat related discolouration of the plastic in the cap.

Referring now to FIG. 5, region 23 on the liner is the area that it seals atop the container mouth. The ultrasonic weld area 21 is located away from the peripheral seal region 23 and is preferably located centrally of the cap, again for aesthetic purposes. Note that because of the strength of the bond the ultrasonic weld does not need to be overly large and because it is located centrally of the liner it does not affect the liner's ability to flex outwardly around the weld for effective sealing to the container mouth.

Figure 7:
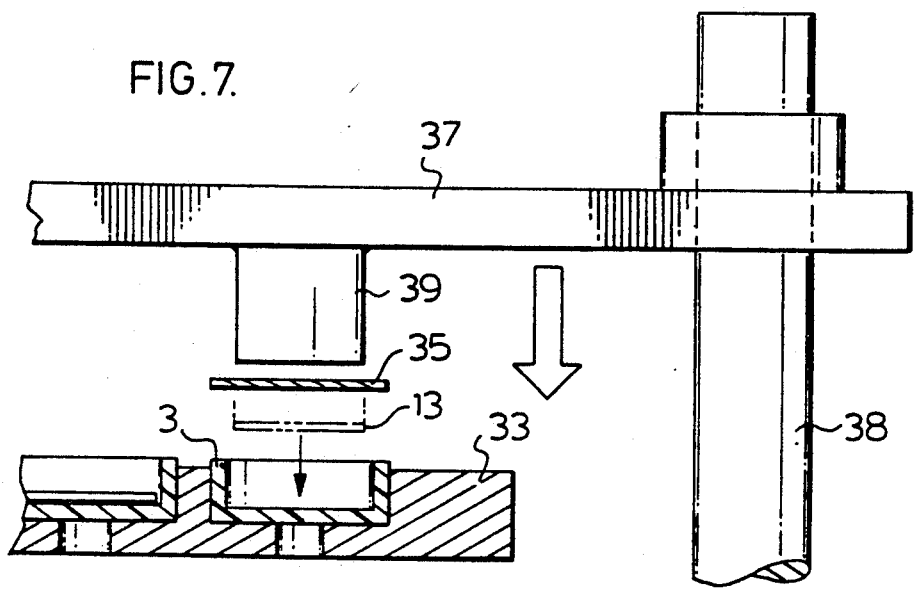
FIG. 7 is a sectional view along the line 7—7 of FIG. 6.
Figure 8:
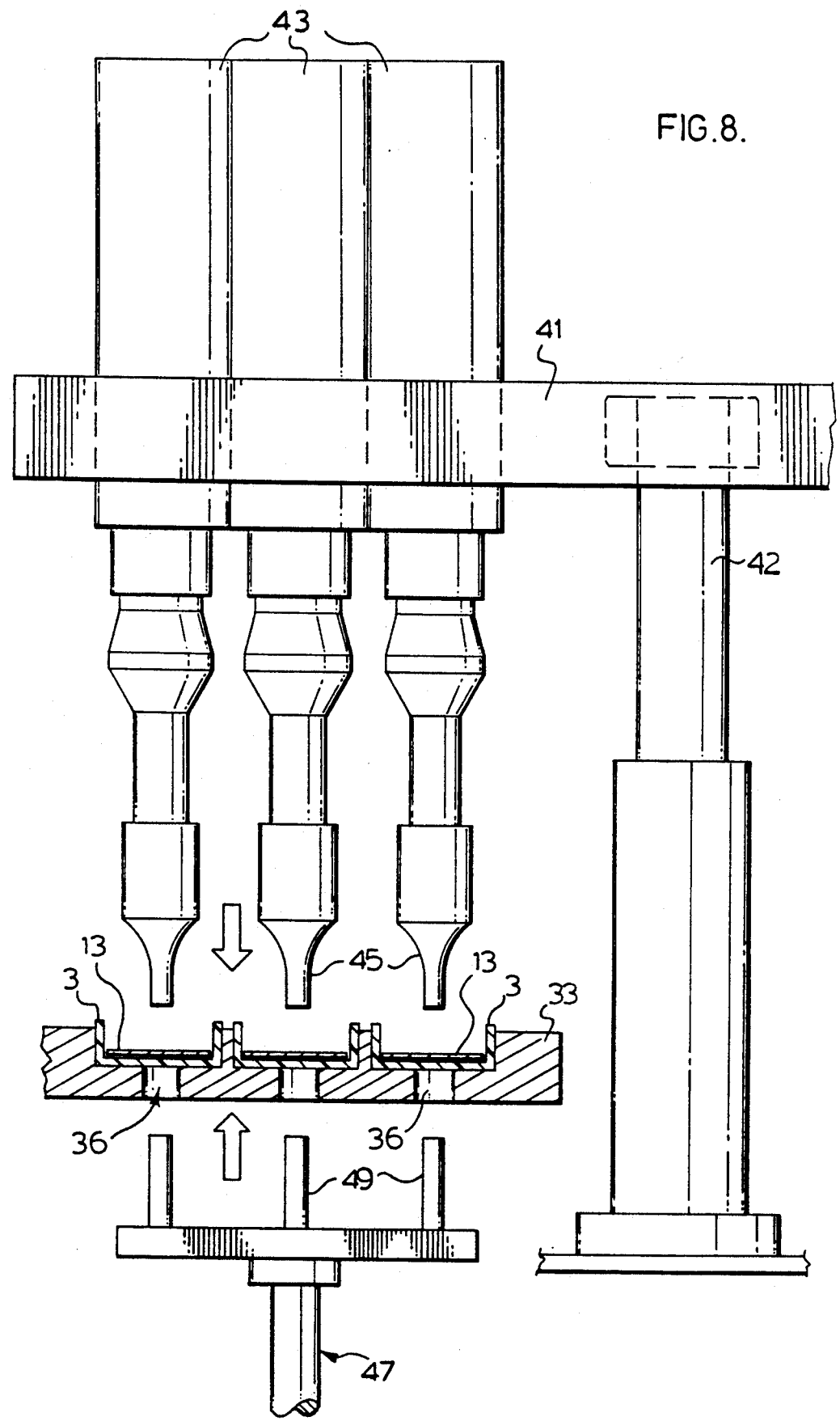
FIG. 8 is a sectional view along the line 8—8 of FIG. 6.

FIGS. 6 through 8 show preferred embodiment apparatus for affecting the insertion of the liner in the cap and then welding the cap and liner to one another. This apparatus includes a cap feed 31, a rotator plate 33, a liner feed 35 and a welding tool 41.

As best seen in FIG. 6 the caps 3 are fed upside down to the rotating plate 33 which has a plurality of circumferential cut outs 34 for receiving each of the caps. The caps are carried by the rotating plate to the liner feed 35 which rotates at 90 degrees to plate 33. The caps in the cap feed are lined up with their respective liners at which point a press 37 including punch members 39 press the liners from the liner feed into the appropriately positioned cap beneath the liner. From here the rotating plate 33 carries each of the now assembled liners and caps to the welding tool 41 as shown in FIG. 8 of the drawings. This welding tool comprises a plurality of individual welders 43 each of which has a vibrating welding tip 45. Welders 43 are moved up and down relative to the caps by means of a movable piston 42.

The rotating plate 33 includes an opening 36 beneath each of the caps 3. A movable piston 47 carrying the tool tips 49 moves up beneath each of the caps to cooperate with the vibrating welding tips 45 performing the ultrasonic weld between the caps and the liners held in plate 33.

It should be noted that in FIG. 3 the cap is turned such that the vibrating welding tip is to the outside or top surface of the cap whereas in FIG. 8 the cap is turned such that the vibrating welding tip is to the inside of the cap. Both arrangements produce an effective ultrasonic weld between the cap and the liner.

After the cap and liner have been welded to one another the caps are deposited from rotating plate 33 onto a conveyor 47 which carries the caps to an appropriate packaging station.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A plastic closure cap for a container having a flat imperforate plastic interior liner, said liner having a mating surface with said cap and said mating surface and said cap being made from plastic materials having at least substantially similar melting temperatures, said cap having a top cap portion and a skirt depending from said top cap portion, said mating surface of said liner being of a corresponding shape and size to said top cap portion and said liner having a peripheral sealing area internal of and adjacent to said cap of said skirt, said cap and said mating surface of said liner being secured at a means defining a break resistant weld formed by melting to one another without penetration through said cap at a location generally centrally of said liner away from said sealing area, such that said means defining a break resistant weld maintains said liner secured to said cap upon removal of said cap from the container.

2. A plastic closure cap as claimed in claim 1 wherein said weld is formed by ultrasonic welding which produces a thinning of the plastic materials in said liner and said cap forming a homogeneous bond between said cap and said liner without affecting flexibility of said liner.

* * * * *